(12) United States Patent
Rimboeck et al.

(10) Patent No.: US 12,162,760 B2
(45) Date of Patent: Dec. 10, 2024

(54) PROCESS FOR PRODUCING SILICON METAL-CONTAINING AGGLOMERATES

(71) Applicant: WACKER CHEMIE AG, Munich (DE)

(72) Inventors: Karl-Heinz Rimboeck, Heldenstein (DE); Konrad Mautner, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 540 days.

(21) Appl. No.: 17/600,665

(22) PCT Filed: Apr. 3, 2019

(86) PCT No.: PCT/EP2019/058387
§ 371 (c)(1),
(2) Date: Oct. 1, 2021

(87) PCT Pub. No.: WO2020/200440
PCT Pub. Date: Oct. 8, 2020

(65) Prior Publication Data
US 2022/0177315 A1 Jun. 9, 2022

(51) Int. Cl.
*C01B 33/02* (2006.01)
(52) U.S. Cl.
CPC .......... *C01B 33/02* (2013.01); *C01P 2006/12* (2013.01)
(58) Field of Classification Search
CPC .............................. C01B 33/02; C01P 2006/12
See application file for complete search history.

(56) References Cited

U.S. PATENT DOCUMENTS

| 3,725,032 A | 4/1973 | Kihlstedt |
| 9,228,246 B2 | 1/2016 | Fristoe et al. |

FOREIGN PATENT DOCUMENTS

| DE | 1963127 A1 | 7/1970 |
| DE | 102009020143 A1 | 11/2010 |
| EP | 3100978 A1 | 12/2016 |
| EP | 3100979 A1 | 12/2016 |
| RU | 2528666 C2 * | 9/2014 |
| WO | 2010003455 A1 | 1/2010 |

OTHER PUBLICATIONS

Wermers, Recycling of Fine Silicon Particles for Solar Grade Silicon Production, Jun. 2018 (Year: 2018).*
Sutjaginskij et al. RU2528666C2 English Translation (Year: 2014).*
Barati et al. Journal of Non-Crystalline Solids 2011, 357, 18-23 (Year: 2011).*

* cited by examiner

*Primary Examiner* — Samir Shah
*Assistant Examiner* — Jordan W Taylor
(74) *Attorney, Agent, or Firm* — BROOKS KUSHMAN P.C.

(57) ABSTRACT

Silicon metal-containing agglomerates are produced by agglomerating a mixture of finely divided silicon metal-containing particles having a particle size parameter d50 of not more than 250 μm and in the dry state a silicon metal content of at least 10% by mass, at least one binder containing 90% to 98% by mass of silicon dioxide and having a specific surface area of 15 to 35 $m_2$/g, and water,
wherein the mass ratio between finely divided silicon metal-containing particles and binder in the mixture is from 80/20 to 99/1, and the resulting moist agglomerates have a water content of 5% to 15% by mass, and drying the agglomerates.

10 Claims, No Drawings

PROCESS FOR PRODUCING SILICON METAL-CONTAINING AGGLOMERATES

CROSS REFERENCE TO RELATED APPLICATIONS

This application is the U.S. National Phase of PCT Appln. No. PCT/EP2019/058387 filed Apr. 3, 2019, the disclosure of which is incorporated in its entirety by reference herein.

BACKGROUND OF THE INVENTION

1. Field of the Invention

The invention relates to a process for producing silicon metal-containing agglomerates from finely divided silicon metal-containing particles and a silicon dioxide-containing binder.

2. Description of the Related Art

The silicon-producing and/or -processing industries produce large amounts of silicon-containing waste and/or byproducts which are in some cases associated with high costs of shipping or disposal for the respective producer. This results in the loss of considerable amounts of metallic silicon.

A number of processes have already been described to bring this silicon back into the value chain according to the circular economy. For use of this recycled silicon in industrial processes the recycled silicon-containing material must meet certain physical, chemical and/or metallurgical criteria. One of these criteria is the chunk/particle size of the silicon-containing material. A large part of the recyclable or already recycled metallic silicon is obtained as a finely divided particle mixture ($d_{50}$<100 μm), which is associated with considerable disadvantages (for example safety-related [dust explosion]) or can render use in certain processes impossible (for example expulsion from reaction zone by exhaust gas flow due to excessively small particle sizes). It is therefore advantageous to subject such finely divided, silicon metal-containing particle mixtures to an agglomeration process.

Agglomeration is a process of mechanical particle enlargement. The corresponding products of this process are referred to as agglomerates and are to be understood as meaning multi-body systems of consolidated particles. Suitable processes for a material to be agglomerated are in principle the three following:
  sintering
  press agglomeration (briquetting, tableting)
  buildup agglomeration (pelletizing)

Advantages of agglomerates over finely divided particle mixtures are generally: higher poured density, defined particle size distributions are producible, better flow and metering characteristics, avoidance/reduction of dust contamination and accompanying material loss, etc. This makes it possible to avoid process engineering problems such as for example caking and demixing of bulk materials.

DE102009020143 A1 discloses a process for workup of sawing scrap from wafer production. In this case sawing scrap containing silicon and organic compounds are granulated on a granulating disk and are thus said to be prepared for further use in chlorosilane production. The disadvantage of this process is that the granulates produced from the crystalline material have only little mechanical stability and quickly fall apart again. This document describes only in general terms that an inorganic binder is added to obtain a more stable granulate.

U.S. Pat. No. 9,228,246B discloses a process in which wastes containing silicon and silicon carbide are partially dehydrated and, after addition of a binder, agglomerated and pelletized. Binders employed include not only polyvinyl alcohols, polyethylene glycols, molasses and sodium silicates but also preferably lignin sulfonates. Disadvantages of the process include the high proportions of organic compounds and functional groups and the fact that the process does not result in desired properties of the particle mixtures for metallurgical processes.

EP3100979 A1 discloses a process for workup of finely divided solids in the production of chlorosilanes which is characterized in that the finely divided solids are held at a temperature of 25° C. to 2500° C. over a duration of 1 min to 24 h to bring about agglomeration by sintering and/or melting of the fine particles in the volume of the finely divided solids. Optional addition of inorganic binders is described here to at least partially overcome the disadvantageous property of the articles obtained according to the invention to liberate hydrogen chloride. The process has the disadvantage of high energy requirements for sintering and/or melting the described solids.

EP3100978 A1 describes a process for workup of finely divided solids in the production of chlorosilanes, wherein the finely divided solids are subjected to hydraulic pressing to afford bodies of elevated density and the finely divided solids are frozen by removing thermal energy or agglomerated by supplying thermal energy. After applying a pressing pressure of not more than 14 kN/cm² the stability of the agglomerate may be increased by freezing at down to −150° C. or by sintering/melting at up to 1400° C. The stability of the pressed bodies obtained after hydraulic pressing is not quantified. The energy requirements for achieving elevated stability of the solids by freezing or sintering/melting are likewise a disadvantage.

The present invention accordingly has for its object to provide a process which allows agglomeration of finely divided silicon metal-containing particle mixtures without exhibiting the disadvantages known from the prior art.

SUMMARY OF THE INVENTION

The invention provides a process for producing silicon metal-containing agglomerates, wherein a mixture of finely divided silicon metal-containing particles having a particle size parameter $d_{50}$ of not more than 250 μm and in the dry state a silicon metal content of at least 10% by mass,
  binder containing 90% to 98% by mass of silicon dioxide and having a specific surface area of 15 to 35 m²/g and water,
  wherein the mass ratio between finely divided silicon metal-containing particles and binder in the mixture is from 80/20 to 99/1,
  is agglomerated,
  wherein the resulting moist agglomerates have a water content of 5% to 15% by mass
  and the agglomerates are subsequently dried.

DETAILED DESCRIPTION OF THE PREFERRED EMBODIMENTS

It has surprisingly been found that the process according to the invention makes it possible to produce agglomerates which are especially suitable for use in metallurgical processes and which show further advantages in addition to the above-described general advantages of particle mixtures of agglomerates compared to the corresponding finely divided particle mixtures. The specific production conditions and binder properties make it possible to achieve certain material properties of the agglomerates produced according to the invention such as a regular shape, a defined porosity and an adjustable inner surface. The agglomerates also exhibit higher strengths than those from known processes. In metallurgical processes the materials employed are repeatedly subjected to different stresses. The strength of these materials is therefore of particular importance.

It is preferable when the finely divided silicon metal-containing particles have an average particle size $d_{50}$ of 0.1 to 150 mm, more preferably 0.5 to 100 mm, yet more preferably 1 to 50 mm, and in particular 5 to 30 mm.

The finely divided silicon metal-containing particles preferably have a specific surface area of 20 to 30 $m^2/g$.

The silicon metal-containing particles in the dry state contain preferably at least 20% by mass, preferably at least 30% by mass, yet more preferably at least 40% by mass, and in particular at least 45% by mass, of metallic silicon.

The silicon metal-containing particles are preferably silicon residues preferably selected from byproducts or wastes of the silicon-producing or -processing industries, for example those:
- generated in the production or in the mechanical processing of silicon, such as polycrystalline, multicrystalline or single-crystal silicon;
- generated in the production of granulated silicon metal, for example in fluidized bed, centrifugal, gas atomization and water granulate processes;
- generated in the production of industrial quality silicon by carbothermic reduction of $SiO_2$;
- generated in the mechanical processing and optionally one or more classifying processes of industrial quality silicon. The mechanical processing may in particular be crushing and/or grinding. Typical classifying processes are for example sieving and/or sifting;
- generated in the production of silanes. These may be for example neutralized contact masses from chlorosilane reactors, before and/or after a recovery of Cu; in particular from Müller-Rochow direct synthesis processes, hydrochlorination or low-temperature converting of silanes.

Purification of these silicon metal-containing particles before use in the process according to the invention is typically not necessary, i.e. the silicon metal-containing particles may be used without further purification steps.

In a preferred embodiment the binder comprises a weight fraction of 2% to 10% by mass, based on the total weight of the binder, of at least one compound selected from the group of $Al_2O_3$, $Fe_2O_3$, CaO, MgO, $Na_2O$, $K_2O$, Cl, C, $P_2O_5$, $SO_3$, $H_2O$ or combinations thereof.

It is preferable when the binder contains at least 92% by mass, more preferably at least 93% by mass, and in particular at least 95% by mass of silicon dioxide.

The binder preferably has a specific surface area of 20 to 30 $m^2/g$. The binder preferably has an LOI (loss on ignition, measurable according to NS-EN 196-2:2013) of 1% to 5% by mass, in particular 2% to 4% by mass.

In a preferred embodiment the binder is so-called microsilica which is generated as a byproduct in the production of industrial quality silicon by carbothermic reduction of silicon dioxide at high temperatures (about 2000° C.) in electric furnaces (for example arc reduction furnaces).

Industrial quality silicon contains <99.9% by mass of Si. The determination assumes 100% by mass, less the weight fractions of possible concomitant elements selected from the group of Fe, Ca, Al, Ti, Cu, Mn, Cr, V, Ni, Mg, Co, W, Mo, As, Sb, Bi, S, Se, Te, Zr, Ge, Sn, Pb, Zn, Cd, Sr, Ba, Y, B, C, P and O.

It is preferable when the mass ratio between finely divided silicon metal-containing particles and binder in the mixture is from 85/15 to 95/5, in particular from 88/12 to 93/7.

The process according to the invention is a buildup agglomeration. The agglomeration may be performed using a pelletizer, such as a pelletizing drum or pelletizing disk. A mixer or agglomerator may additionally be arranged upstream of the pelletizer.

The addition of the input materials finely divided silicon-containing particles and binder may be carried out jointly or separately, this addition being performed manually or in automated fashion. Instead of the mixer or agglomerator the binder may optionally also be added to the pelletizer in part or in full.

The obtained moist agglomerates preferably have a water content of 8% to 12% by mass. The water content may be adjusted by admixing the finely divided silicon-containing particles or the binder or the mixture with water before the agglomeration or during the agglomeration or both before the agglomeration and during the agglomeration.

The moist agglomerates are withdrawn from the pelletizer and subsequently dried, for example in a rotary dryer, to obtain the dried agglomerates. It may be preferable to subject the dried agglomerates to a classifying step, for example using a sieve or sifter, in order for example to establish more precise particle size distributions, to obtain classified agglomerates. It may be advisable, in order to improve the properties of the dried agglomerates, to subject even the moist agglomerates to a classifying step before they are dried. Proportions removed in the classifiers are optionally comminuted, for example by milling or crushing, and added to the mixer or agglomerator once again.

The drying of the agglomerates is preferably carried out at a temperature of 500° C. to 1000° C., in particular 700° C. to 950° C., for a duration of 5 min to 24 h, in particular 30 min to 2 h.

The agglomerates produced according to the invention may be employed for example in the following metallurgical processes:
- in the production of industrial quality silicon (purity 95% to 99% by mass of Si; for example so-called metallurgical silicon having a purity of 97-99% by mass of Si)
- in the production of silicon with a purity of >99% by mass of Si (for example UMG-Si [upgraded metallurgical grade], SG-Si [solar grade], EG-Si [electronic grade])
- in the production of silicon for accumulator applications, for example as an anode material in lithium-ion accumulators or lithium-silicon batteries
- in the production of so-called ferrosilicon (alloys of ca. 45-90% by mass of Si and ca. 10-55% by mass of Fe)
- in the production of so-called "calcium silicon" (calcium disilicide $CaSi_2$, ca. 60% by mass of Si and ca. 40% by mass of Ca)
- in the production of steel (use as deoxidant)
- in the production of alloys (for example use as alloying constituent of casting alloys of aluminum, copper, titanium and iron)

The agglomerates produced according to the invention are preferably employed in industrial furnaces selected from the group of arc furnaces, basic oxygen furnaces (Linz-Donawitz process), shaft furnaces (for example cupola furnace), induction furnaces, holding furnaces, melting furnaces, and casting furnaces. The agglomerates are especially also employed in containers containing metal melts. The agglomerates are here used as a reducing agent, slag former or alloying agent/silicon metal source.

The particle size parameter $d_{50}$ of the dried agglomerates is preferably 1 to 100 mm, more preferably 2 to 50 mm, and in particular 5 to 30 mm. The porosity of the dried agglomerates is preferably 0.1 to 40, more preferably 0.15 to 30, and in particular 0.2 to 25. The water content of the dried agglomerates is preferably 0.05% to 1% by mass, more preferably 0.1% to 0.50% by mass.

The compressive strength of the dried agglomerates, i.e. maximum stress, is preferably 1500 to 4000 N, more preferably 2000 to 3500 N.

The determination of the physical and chemical properties of the binder and of the composition and the corresponding weight fractions of the constituents is carried out according to the standards NS-EN 13263-1, NS-EN 13263-2 and NS-EN 196-6.

The determination of silicon contents may be carried out for example via x-ray fluorescence analysis (XFA), ICP-based analytical methods (ICP-MS, ICP-OES) or atom absorption spectroscopy (AAS).

Mixtures of particulate substances having a particle diameter of predominantly >0.1 mm are typically subjected to sieve analyses to characterize the particle mixture. Determination of particle size distribution by sieve analysis is carried out according to DIN 66165. Calculation of average particle sizes/diameters from particle size distributions may be carried out according to DIN ISO 9276-2.

For mixtures of particulate substances having a particle diameter of predominantly <0.1 mm the determination of particle size distributions is carried out according to ISO 13320 (laser diffraction) and/or ISO 13322 (image analysis). Calculation of average particle sizes/diameters from particle size distributions may be carried out according to DIN ISO 9276-2.

The total porosity of a substance is made up of the sum total of the voids connected to one another and to the environment (open porosity; in the present invention referred to as effective porosity) and the voids not connected to one other (closed porosity). Porosity measurements are carried out in accordance with Archimedes' principle and according to ASTM C373-88. The porosity of a material may further be carried out by calculation from absolute and apparent density. Absolute and apparent density may be determined according to weight measurement and volume measurement by gas pycnometers. The density determination of solids is described in DIN 66137-2:2019-03.

EXAMPLE

The experiment described hereinbelow was performed in ambient air and at room temperature (20° C.)

In a mixing vessel a finely divided silicon-containing material to be pelletized ($d_{50}$ of 15 μm; silicon metal content of 50% by mass) is mixed with a binder (96.6% by mass $SiO_2$, 0.08% by mass $Fe_2O_3$, 0.18% by mass $Al_2O_3$, 0.34% by mass CaO, 0.22% by mass MgO, 0.45% by mass $K_2O$, 0.48% by mass $Na_2O$, 0.01% by mass Cl, 1.2% by mass C, 0.04% by mass $P_2O_5$, 0.25% by mass $SO_3$, 0.21% by mass $H_2O$; LOI of 1.3% by mass; specific surface area of 27.6 $m^2/g$) in a mass ratio of 90/10 and subsequently transferred into a pelletizing drum having a diameter of 0.7 m, wherein the mixture has a total weight of 1 kg upon addition. During the agglomeration process in the manually operated, rotating pelletizing drum the mixture is wetted and kept moist with water by jetting same. When the agglomerates have reached a size of 20 to 25 mm and have a water content of 10% by mass, the buildup agglomeration process is terminated. The resulting moist agglomerates are transferred into a rotary dryer, the dryer being heated at a temperature ramp of 30° C./min until a temperature of 900° C. is achieved. The latter is maintained for 30 min. This then affords the dried agglomerates having the following properties: Particle size parameter $d_{50}$ of 22 mm, porosity of 0.24, water content of 0.15% by mass, compressive strength of 2350 N.

The invention claimed is:

1. A process for producing silicon metal-containing agglomerates, comprising:
    agglomerating a mixture of finely divided silicon metal-containing particles having a particle size parameter $d_{50}$ of not more than 250 μm and in the dry state a silicon metal content of at least 10% by mass, a
    binder containing 90% to 98% by mass of silicon dioxide and having a specific surface area of 15 to 35 $m^2/g$, and water,
    wherein the mass ratio between finely divided silicon metal-containing particles and binder in the mixture is from 80/20 to 99/1,
    wherein the resulting moist agglomerates have a water content of 5% to 15% by mass based on the total weight of the agglomerates,
    and drying the agglomerates to form dried agglomerates, wherein drying of the agglomerates is carried out at a temperature of 500° C. to 1000° C.

2. The process of claim 1, wherein the finely divided silicon metal-containing particles are silicon residues selected from byproducts or wastes of the silicon-producing or silicon-processing industries.

3. The process of claim 1, wherein the binder comprises a weight fraction of 2% to 10% by mass, based on the total weight of the binder, of at least one compound selected from the group consisting of $Al_2O_3$, $Fe_2O_3$, CaO, MgO, $Na_2O$, $K_2O$, Cl, C, $P_2O_5$, $SO_3$, $H_2O$ and combinations thereof.

4. The process of claim 1, wherein the binder is a microsilica which is generated as a byproduct in the production of industrial quality silicon by carbothermic reduction of silicon dioxide in an electric furnace.

5. The process of claim 1, wherein the water content of 5% to 15% of the moist agglomerates is adjusted by admixing the finely divided silicon-containing particles, the binder, or a mixture thereof with water during agglomeration.

6. The process of claim 1, wherein the particle size parameter $d_{50}$ of the dried agglomerates is in the range of from 1 to 100 mm.

7. The process of claim 1, wherein the water content of the dried agglomerates is from 0.05% to 1% by mass based on the total weight of the dried agglomerates.

8. The process of claim 1, wherein the binder has a loss on ignition of from 1 to 5% by mass.

9. The process of claim 1, wherein the dried agglomerates have a porosity of from 0.15 to 30%.

10. The process of claim 1, wherein drying of the agglomerates is carried out at a temperature of 500° C. to 1000° C.

* * * * *